D. W. PARKER.
STONE SAWING MACHINE.
APPLICATION FILED OCT. 14, 1912.

1,095,415.

Patented May 5, 1914.
3 SHEETS—SHEET 1.

WITNESSES:
F.C. Matheny
E. Peterson

INVENTOR
Daniel W. Parker
BY
Pierre Barnes
ATTORNEY

D. W. PARKER.
STONE SAWING MACHINE.
APPLICATION FILED OCT. 14, 1912.

1,095,415.

Patented May 5, 1914.

3 SHEETS—SHEET 2.

WITNESSES:

INVENTOR
Daniel W. Parker
BY
Pierre Barnes
ATTORNEY

D. W. PARKER.
STONE SAWING MACHINE.
APPLICATION FILED OCT. 14, 1912.

1,095,415.

Patented May 5, 1914.
3 SHEETS—SHEET 3.

WITNESSES:
F. E. Matheny
E. Peterson

INVENTOR
Daniel W. Parker
BY
Pierre Barnes
ATTORNEY

UNITED STATES PATENT OFFICE.

DANIEL W. PARKER, OF EVERETT, WASHINGTON.

STONE-SAWING MACHINE.

1,095,415. Specification of Letters Patent. Patented May 5, 1914.

Application filed October 14, 1912. Serial No. 725,610.

*To all whom it may concern:*

Be it known that I, DANIEL W. PARKER, a citizen of the United States, residing at Everett, in the county of Snohomish and State of Washington, have invented certain new and useful Improvements in Stone-Sawing Machines, of which the following is a specification.

This invention relates to stone sawing machines; and the object of the invention is the perfecting of such devices whereby the operations thereof may be facilitated and more economically performed than hitherto.

The invention consists in the novel construction, adaptation and combination of devices, as will be hereinafter described and claimed.

Figure 1:
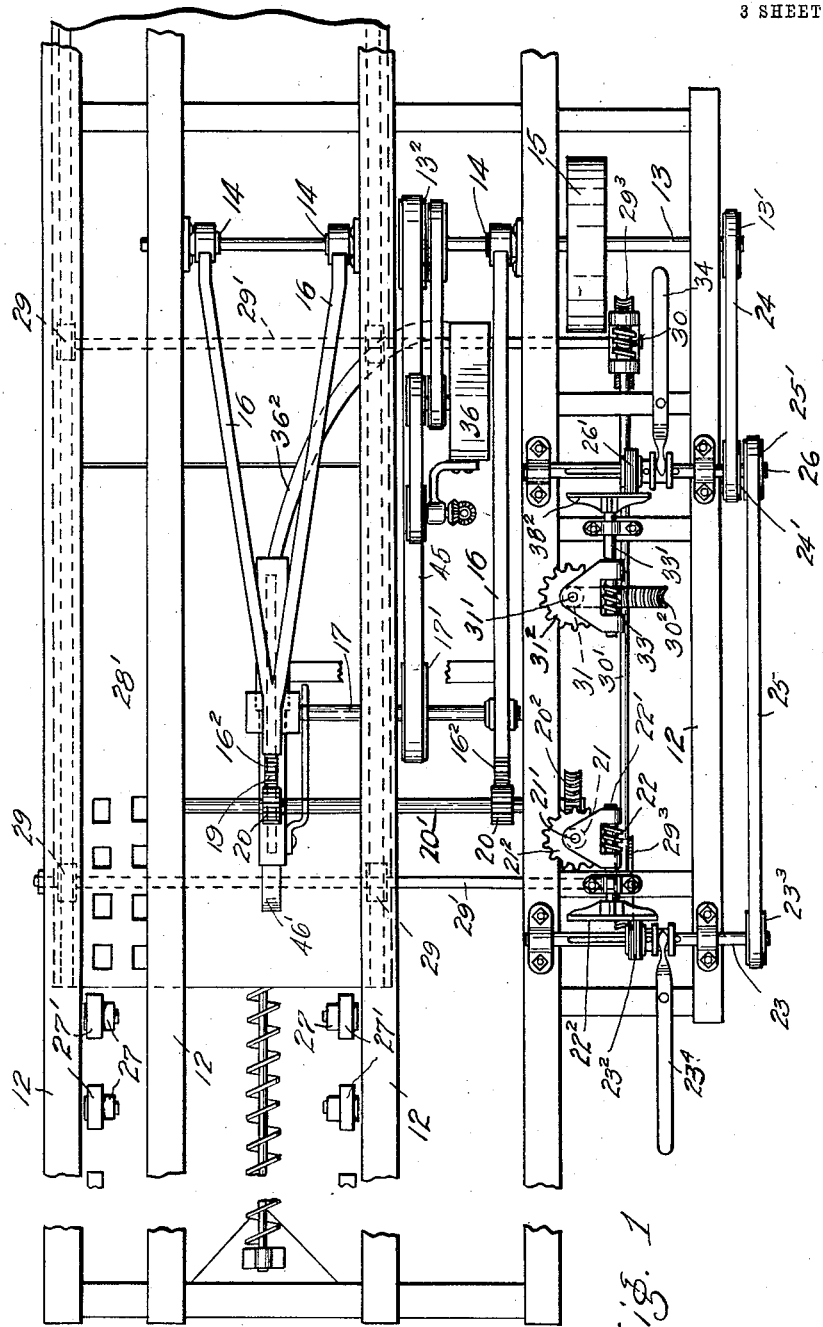
Figure 2:
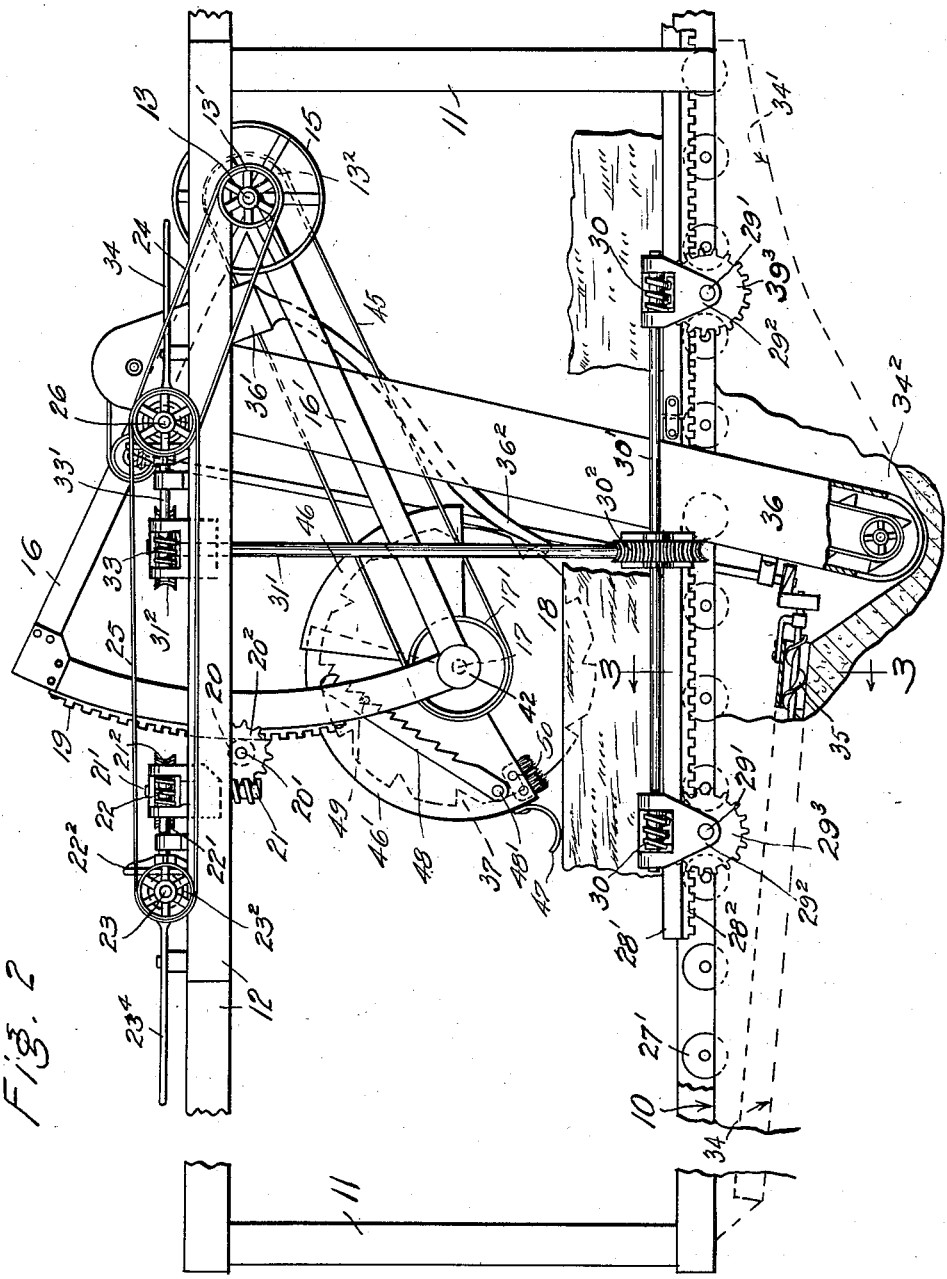
Figure 4:
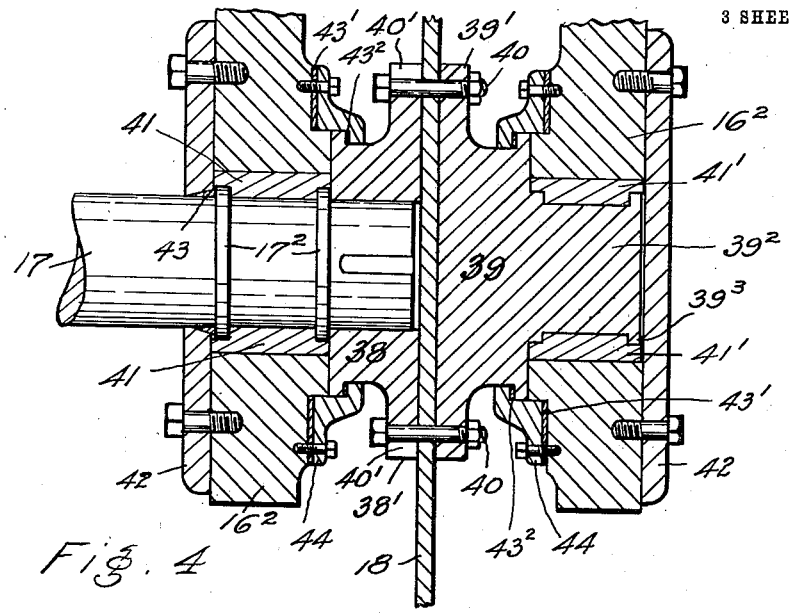
Figure 5:
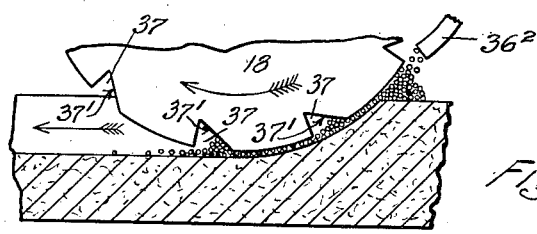
Figure 3:
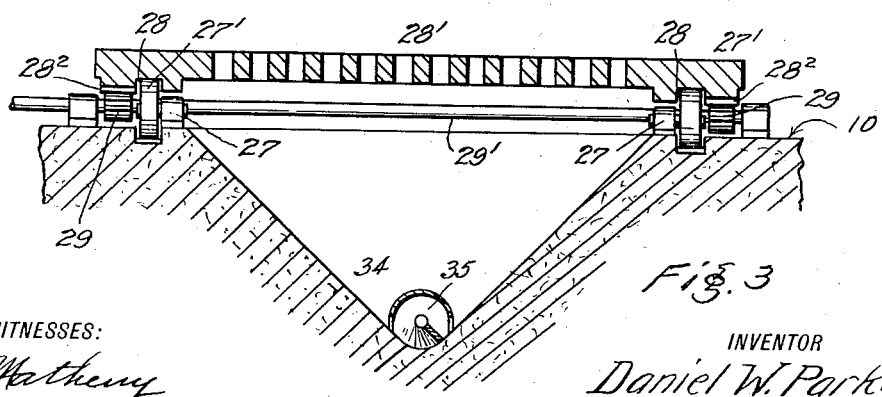

In the accompanying drawings, Figure 1 is a plan view of a stone sawing machine embodying my invention. Fog. 2 is a side elevation of the same. Fig. 3 is a sectional view through 3—3 of Fig. 2. Fig. 4 is a detail transverse sectional view of the devices employed for securing a saw to the arbor. Fig. 5 is a fragmentary sectional view of a saw shown applied.

The reference numeral 10 designates the base or floor upon which is supported a rigid framework comprised of posts 11 and beams 12.

13 represents a transverse shaft which is journaled in bearing boxes 14 secured to said framework at a distance above the floor and is driven from a power shaft, as by a belt passing about the pulley 15. Hingedly connected to the boxes 14 are oscillatory frame members each of a substantially triangular shape in elevation and comprised of diverging arms 16 and $16^1$ which are respectively connected at their outer ends by arcuate elements $16^2$ which are concentric to the axis of oscillation of the frame members. Adjacent to the lower ends of the arcuate elements $16^2$ are provided journal bearings for a horizontally arranged arbor 17 which carries a circular saw 18.

Formed or provided upon the convex side of the frame elements $16^2$ are rack teeth 19 which are engaged by toothed pinions 20 mounted upon a horizontal shaft $20^1$ and likewise carrying a gear wheel $20^2$ which is rotated by means of a worm 21 provided on an upright shaft $21^1$. The latter is provided with a gear wheel $21^2$ which is in mesh with a worm 22 provided upon a horizontal shaft $22^1$ having mounted at one end thereof a disk friction element $22^2$.

23 represents a horizontal shaft disposed in rectangular relations to the shaft $22^1$ and having splined thereto a wheel $23^2$ whose periphery is in frictional engagement with the face of the disk $22^2$.

$23^4$ is a shifter lever whereby axial movement is afforded to the wheel $23^2$ to move the latter diametrically with respect to the disk in order to transmit rotary motions at various speeds from the shaft 23 to the shaft $22^1$ and cause the last named shaft to be driven in either rotary direction as may be required for swinging the oscillatory frame up or down, as will be understood. The shaft 23 is driven in any suitable manner, as from the shaft 13 by means of belts 24 and 25 (see Fig. 1) passing about pulleys $13^1$ and $23^3$ upon the respective shafts and pulleys $24^1$ and $25^1$ upon an intermediately disposed counter-shaft 26.

Positioned upon the floor 10 are chairs 27 in which are journaled the axles of rollers $27^1$ which operate in ways 28 provided in the underside of a table $28^1$ and serves to support and guide the latter. Secured to the underside of said table are racks $28^2$ which are in mesh with toothed pinions 29, Figs. 1 and 3, mounted upon transverse shafts $29^1$ which are journaled in bearing boxes $29^2$. Upon an end of each of the shafts $29^1$ is a gear $29^3$ which is driven by a worm 30 provided on a longitudinal shaft $30^1$. This shaft has mounted thereon a gear $30^2$ in mesh with a worm 31 provided at the lower end of an upright shaft $31^1$ and having at its upper end a gear $31^2$ which is in turn driven by a worm 33 provided on a horizontal shaft $33^1$. This shaft is provided with a disk $33^2$ in frictional engagement with a driving wheel $26^1$ which is splined to the aforesaid counter-shaft 26 and is movable by a shifter 34 to regulate the speed and direction of rotation of the disk $33^2$ to accordingly cause the table to travel in either direction and at selected speeds.

Abrading shot and water is employed, as customary, with the present invention and, after being utilized, is collected in inclined gutters 34 and $34^1$ and a pit $34^2$ provided below the track of the table. A power driven screw conveyer, such as 35, Figs. 2 and 3, may advantageously be employed at the bottom of the gutter 34 in advance of the table to transport the shot into said pit. Extending into the pit and to a suitable height above the saw is an elevator 36 which delivers the shot from the pit into a hopper, indicated by $36^1$ in Fig. 2, whence the shot is supplied with water by a tube $36^2$ in front of the saw 18 to be drawn thereby into the saw-kerf.

As best shown in Fig. 5, the saw is formed in its periphery with angular shaped recesses, or gullets, 37 having the rearmost side $37^1$ of each inclined so that as these sides advance they will cause the shot to be forced down against the bottom of the kerf and thereby promote the abrasion of the stone.

In Fig. 4 I illustrate devices for clamping the saw 18 to its arbor 17 and also provision for protecting the journal bearings from the presence of gritty matter. The clamping devices comprise two cast metal members 38 and 39 provided with flanges $38^1$ and $39^1$ which are juxtaposed with the saw, as shown, and through which the clamping bolts 40 extend. To accommodate the withdrawal of the bolts for the removal of the saw, slots, as $40^1$, are provided about the circumference of one of the flanges and in which the bolt may be tilted after being withdrawn from the other flange. The arbor extends into the member 38 to within proximity of the saw. The arbor is journaled in brasses 41 provided in one of the frame elements $16^2$. At the other side of the saw, a journal is afforded by a stub $39^2$ provided on a clamp member 39 acting in coöperation with brasses $41^1$ which are housed in another of the elements $16^2$. Annular ridges $17^2$, for the arbor, and $39^3$, for the stub $39^2$, interfitting with grooves provided in the respective brasses, serve to obviate any endwise movement to the arbor. To prevent the admission of grit to these journals I provide a cover plate 42 detachably secured to the outer frame element $16^2$ and spanning the extremity of the stub $39^2$ and the brasses $41^1$. A collar $42^a$ surrounds the arbor, as shown, and is employed to retain packing 43 in place about the arbor. Packing $43^1$ and $43^2$ is also utilized with retaining collars 44 and $44^1$ to protect the interstices between the clamping members and the companion frame elements $16^2$. The above mentioned collars are each made of semi-circular segments in order to allow their being placed in position. The saw arbor is driven by a belt 45 passing about pulleys $17^1$ and $13^2$ on the arbor and shaft 13, respectively.

46 and $46^1$ represent sector shaped guard members for the saw to prevent shot, water and the material which may adhere to the saw as it leaves the saw-kerf being thrown upwardly and rearwardly. The guard member 46 is desirably secured to the oscillating frame which carries the saw; while the other member $46^1$ is arranged for revoluble movements about the axis of the saw arbor.

47 is a runner attached to the guard member $46^1$ and is utilized for supporting the member by bearing against the top surface of a stone. Supplementary to said runner is a ratchet rod 48 connected by a pivotal pin $48^1$ to member $46^1$ (see Fig. 2) and engageable upon a stud 49 provided on the oscillating frame. Upon each side of the saw is a brush, as 50, which is secured to member $46^1$ and disposed to sweep the saw.

In operation, the stone, or stones to be sawed are placed upon the table which is then caused to be fed forward through the agency of the described racks $28^2$ and the power driven pinions 29. As the table advances, the saw 18 is brought down into cutting position with respect to the work through the instrumentality of the pinions 20 engaging the racks 19 of the oscillatory frame. The downward swinging movements of this frame may be used as a feed for the saw, by being continuous, through a proper adjustment of the driving frictional element $23^2$ with respect to the driven disk element $22^2$; or the height of the saw may be regulated, and be thus maintained by shifting the element $23^2$ medially of the disk $22^2$.

What I claim, is—

1. In a stone sawing machine, the combination with a circular saw and a vertically adjustable oscillatory frame therefor, of a stationary saw guard and a movable saw guard about the axis of the saw, and means engageable with a device provided on said frame for suspending the movable guard in predetermined positions.

2. In a stone sawing machine, the combination with a circular saw and a vertically adjustable oscillatory frame therefor, of a saw guard movable about the axis of the saw, means carried by the guard and arranged to bear upon the top surface of the work for regulating the position of the guard with respect to said surface, and means engageable with a device provided on said frame for suspending the guard in predetermined positions.

3. In a stone sawing machine, the combination with a circular saw and a vertically adjustable oscillatory frame therefor, of a saw guard movable about the axis of the saw, and means carried by the guard and arranged to bear upon the top surface of the work for regulating the position of the guard with respect to said surface.

4. In a stone sawing machine, the combination with a circular saw and a vertically adjustable oscillatory frame therefor, of a saw guard movable about the axis of the saw, means carried by the guard and arranged to bear upon the top surface of the work for regulating the position of the guard with respect to said surface, means engageable with a device provided on said frame for suspending the guard in predetermined positions, and brushes for sweeping the saw.

5. In a stone sawing machine, the combination with a circular saw and a vertically adjustable oscillatory frame therefor, of a saw guard movable about the axis of the saw, a rack bar carried by said guard, and means carried by said frame to be engaged by said rack for suspending the guard in predetermined positions.

6. In a stone sawing machine, the combination with a circular saw and a vertically adjustable oscillatory frame therefor, of a saw guard movable about the axis of the saw, means carried by the guard and arranged to bear upon the top surface of the work for regulating the position of the guard with respect to said surface, and means also carried by said guard for sweeping the saw.

Signed at Everett, Wash., this 14th day of September, 1912.

DANIEL W. PARKER.

Witnesses:
ALBERT N. SMITH,
L. E. THOMPSON.